(12) United States Patent
Zhao et al.

(10) Patent No.: US 10,302,836 B1
(45) Date of Patent: May 28, 2019

(54) BACKLIGHT MODULE AND METHOD FOR PREPARING THE SAME, DISPLAY DEVICE

(71) Applicants: BOE TECHNOLOGY GROUP CO., LTD., Beijing (CN); Fuzhou BOE Optoelectronics Technology Co., Ltd., Fujian (CN)

(72) Inventors: Hongyu Zhao, Beijing (CN); Zongjie Bao, Beijing (CN); Jie Liu, Beijing (CN); Kai Diao, Beijing (CN); Jinku Lv, Beijing (CN)

(73) Assignees: BOE TECHNOLOGY GROUP CO., LTD., Beijing (CN); FUZHOU BOE OPTOELECTRONICS TECHNOLOGY CO., LTD., Fuzhou (CN)

( * ) Notice: Subject to any disclaimer, the term of this patent is extended or adjusted under 35 U.S.C. 154(b) by 0 days.

(21) Appl. No.: 16/049,603

(22) Filed: Jul. 30, 2018

(30) Foreign Application Priority Data

Jan. 3, 2018 (CN) .......................... 2018 1 0004531

(51) Int. Cl.
*F21V 8/00* (2006.01)

(52) U.S. Cl.
CPC .......... *G02B 6/0018* (2013.01); *G02B 6/002* (2013.01); *G02B 6/0088* (2013.01)

(58) Field of Classification Search
CPC ..... G02B 6/0018; G02B 6/002; G02B 6/0088
See application file for complete search history.

(56) References Cited

U.S. PATENT DOCUMENTS

| 2004/0239831 | A1* | 12/2004 | Palumbo | G02B 6/0018 349/64 |
|---|---|---|---|---|
| 2005/0157521 | A1* | 7/2005 | Chen | G02B 6/0018 362/633 |
| 2012/0026653 | A1* | 2/2012 | Zhou | B29C 45/4421 361/679.01 |
| 2013/0077014 | A1* | 3/2013 | Yang | G02F 1/133308 349/58 |
| 2015/0301272 | A1* | 10/2015 | Chang | G02B 6/00 349/58 |
| 2016/0313595 | A1* | 10/2016 | Zhou | G02B 6/0055 |
| 2017/0139127 | A1* | 5/2017 | Zeng | G02B 6/0091 |

* cited by examiner

*Primary Examiner* — Mary Ellen Bowman
(74) *Attorney, Agent, or Firm* — McDermott Will & Emery LLP (57) ABSTRACT

A backlight module includes a backplane including a base plate, and a light guide plate disposed at a side of the base plate. A mounting hole is formed in the base plate, and a light source is installed in the mounting hole. The light guide plate includes a light guide portion located within a frame area of the backlight module, and a light emitting portion located within a transparent area of the backlight module. An orthographic projection of the light guide portion on the base plate at least covers the mounting hole, and the light guide portion is configured to reflect the light emitted by the light source to the light emitting portion.

12 Claims, 4 Drawing Sheets

BACKLIGHT MODULE AND METHOD FOR PREPARING THE SAME, DISPLAY DEVICE

CROSS-REFERENCE TO RELATED APPLICATION

This application claims priority to Chinese Patent Application No. 201810004531.6, filed on Jan. 3, 2018, and titled "A BACKLIGHT MODULE AND METHOD FOR PREPARING THE SAME, DISPLAY DEVICE", which is incorporated herein by reference in its entirety.

TECHNICAL FIELD

The present disclosure relates to the field of display technologies, and more particularly to a backlight module, a method for preparing the same, and a display device.

BACKGROUND

With the improvement of living standards, people have higher demands for the visual experience of the display device, which is affected not only by the display performance of the device, but also by the narrow bezel of the device.

SUMMARY

Some embodiments of the present disclosure provide a backlight module, including a backplane, and the backplane includes a base plate. A mounting hole is formed in the base plate, and a light source is installed in the mounting hole. The backlight module further includes a light guide plate disposed at a side of the base plate. The light guide plate includes a light guide portion located within a frame area of the backlight module, wherein, an orthographic projection of the light guide portion on the base plate at least covers the mounting hole; and a light emitting portion located within the transparent area of the backlight module, wherein, the light guide portion is configured to reflect the light emitted by the light source to the light emitting portion.

In some embodiments, there is a gap between a light-emitting surface of the light source close to the light guide portion and a bottom surface of the light guide portion close to the light source.

In some embodiments, the light guide portion includes: a light reflecting portion configured to reflect the light emitted by the light source to the light emitting portion; and a light importing portion, via its light emitting surface, fixed to an end of the light reflecting portion. A bottom surface of the light importing portion away from the light reflecting portion is at least opposite to the mounting hole, and a light emitting surface of the light reflecting portion is connected to the light emitting portion.

In some embodiments, the backplane further includes a side plate fixedly connected to the base plate, and a surface of the light reflecting portion close to the side plate is an inclined surface with a reflection structure; or, surfaces of the light importing portion and the light reflecting portion close to the side plate are inclined surfaces with a reflection structure, and the inclined surfaces of the light importing portion and the light reflecting portion are located in a same plane.

In some embodiments, the surface of the light reflecting portion close to the side plate is an inclined surface with a reflection structure, the bottom surface of the light importing portion, and a light incident surface of the light reflecting portion are both parallel to a board surface of the base plate; the inclined surface of the light reflecting portion is connected to the light incident surface of the light reflecting portion and the light emitting surface of the light reflecting portion, and an angle between the inclined surface of the light reflecting portion and the light incident surface of the light reflecting portion ranges from 30° to 60°.

In some embodiments, the surfaces of the light importing portion and the light reflecting portion close to the side plate are inclined surfaces with a reflection structure, and the inclined surfaces of the light importing portion and the light reflecting portion are located in a same plane; the bottom surface of the light importing portion, and the light incident surface of the light reflecting portion are both parallel to the board surface of the base plate; the inclined surface of the light importing portion is connected to the bottom surface of the light importing portion and the light emitting surface of the light importing portion; the inclined surface of the light reflecting portion is connected to the light incident surface of the light reflecting portion and the light emitting portion of the light reflecting portion; an angle between the inclined surface of the light importing portion and the bottom surface of the light importing portion ranges from 30° to 60°, and an angle between the inclined surface of the light reflecting portion and the light incident surface of the light reflecting portion ranges from 30° to 60°.

In some embodiments, optical films are disposed on a light emitting surface of the light emitting portion, and the optical films are connected to the side plate through a plastic frame; the plastic frame includes a connecting portion and a clamping portion disposed on the connecting portion, the connecting portion is connected to the side plate and the optical film, an end of the clamping portion touches the inclined surface of the light reflecting portion.

In some embodiments, the orthographic projection of the light guide portion on the base plate coincides with the mounting hole, the bottom surface of the light guide portion is located in the mounting hole, and a cushion is disposed on a wall of the mounting hole.

In some embodiments, a supporting block is disposed on a surface of the base plate close to the light guide portion; the orthographic projection of the light guide portion on the base plate covers the mounting hole, an orthographic projection of the supporting block on the base plate is located within the orthographic projection of the light guide portion on the base plate; and a light-emitting surface of the light source close to the light guide plate is flush with a surface of the base plate close to the light guide plate.

In some embodiments, the light source is a top view type LED light source or a beam expanding laser light source; the mounting hole has a through-hole structure running through the base plate, and a fixed part configured to fix the light source in the mounting hole is disposed on a surface of the base plate away from the light guide plate.

In some other embodiments, the light source is a side view type LED light source; the mounting hole has a through-hole structure running through the base plate, and the side view type LED light source is fixed on a wall of the mounting hole.

Some embodiments provide a method for preparing a backlight module, and the backlight module is the aforementioned backlight module. The method includes: forming a mounting hole in the base plate, the mounting hole having a through-hole structure running through the base plate; disposing the light guide plate above the base plate, wherein the light guide plate comprises a light guide portion and a light emitting portion, an orthographic projection of the light guide portion on the base plate at least covers the mounting hole; the light guide portion is configured to reflect light emitted by the light source to the light emitting portion, the light guide portion is located within a frame area of the backlight module, and the light emitting portion is located within a transparent area of the backlight module; installing the light source into the mounting hole from a side of the base plate away from the light guide plate.

Some embodiments of the present disclosure provide a display device including the above backlight module.

BRIEF DESCRIPTION OF THE DRAWINGS

In order to describe technical solutions in embodiments of the present disclosure more clearly, the accompanying drawings to be used in the description of embodiments will be introduced briefly. Obviously, the accompanying drawings to be described below are merely some embodiments of the present disclosure, and a person of ordinary skill in the art can obtain other drawings according to those drawings without paying any creative effort.

DETAILED DESCRIPTION

Technical solutions in embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1:
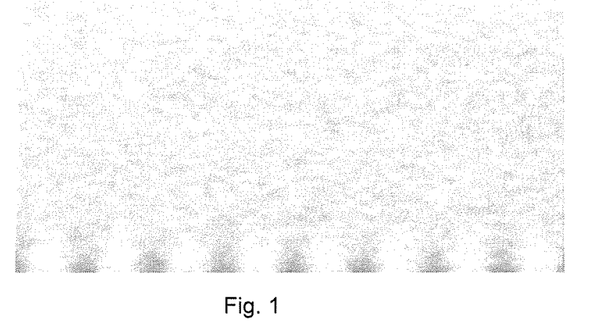
FIG. 1 is a schematic diagram of a picture showing the firefly phenomenon in the related art.

If a backlight module of a narrow-bezel display device is a side-type backlight module, the distance between a light emitting diode (LED) strip and a light incident surface of a light guide plate is usually small, so that bright-dark light spots are formed by the light, which is emitted from LEDs arranged on the LED strip, projected onto the light guide plate. Therefore, a portion of a picture displayed by the display device close to the light guide plate displays bright-dark stripes shown in FIG. 1, and this phenomenon is called a firefly phenomenon.

Figure 2:
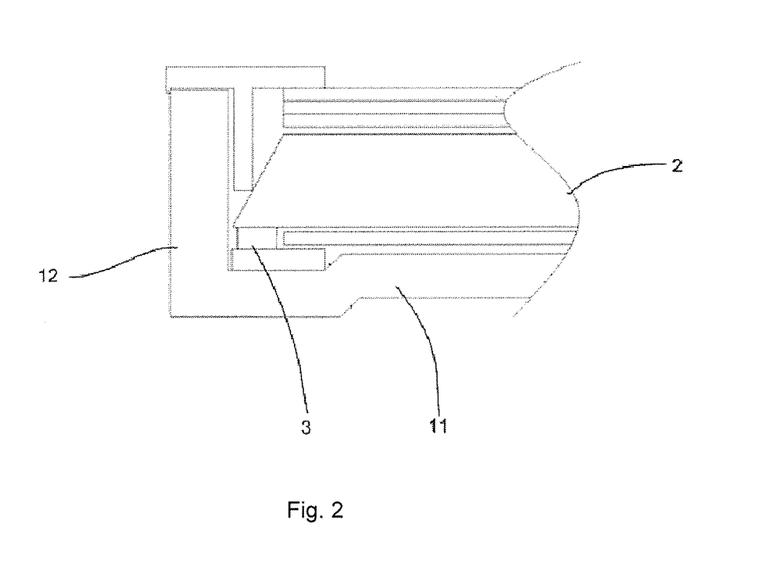
FIG. 2 is a schematic structure diagram of a backlight module in the related art.

FIG. 2 shows a backlight module in the related art. As shown in FIG. 2, a light source 3 is disposed on a base plate 11, and a portion of a light guide plate 2 is located above the light source 3. Although light emitted by the light source 3 may firstly transmit along a thickness direction of the light guide plate 2 and then enter into part of the light guide plate 2 corresponding to the display area, the firefly phenomenon still exists. In addition, since the light source 3 shown in FIG. 2 generally has a beam angle of 120°, a portion of the light emitted by the light source 3 may pass easily through a gap between the light guide plate 2 and a side plate 12, and come toward a plastic frame and the side plate 12. Therefore, this portion of the light comes toward the light guide plate 2 after being reflected by the plastic frame and the side plate 12, and thus light emitted from the light guide plate 2 cannot be homogeneous, so that the picture displayed by the display device appears a lamp shadow.

Figure 3:
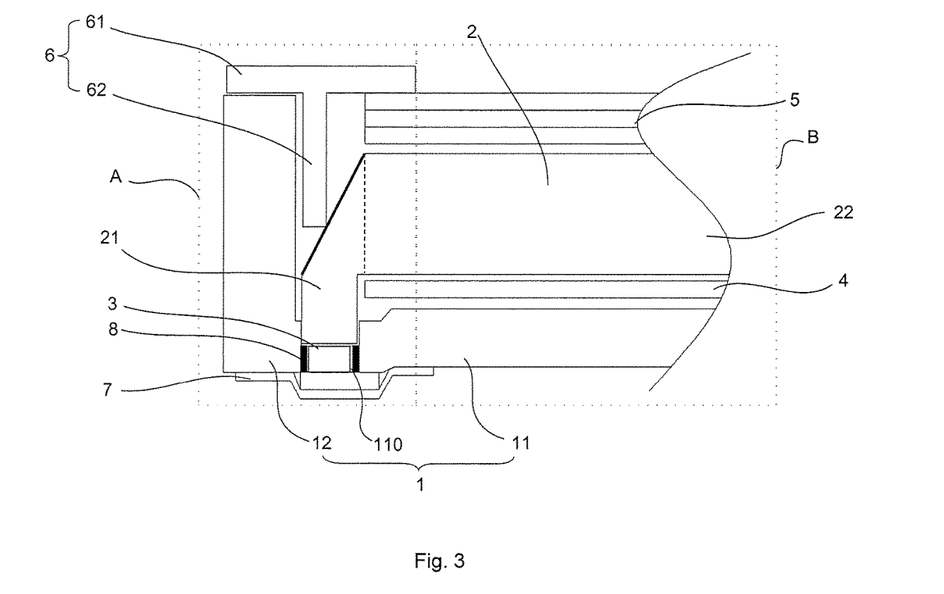
FIG. 3 is a schematic diagram of a backlight module according to some embodiments of the present disclosure.

Some embodiments of the present disclosure provide a backlight module. As shown in FIG. 3, the backlight module includes a backplane 1 and a light guide plate 2. The backplane 1 includes a base plate 11, and the light guide plate 2 is disposed at a side of the base plate 11. A mounting hole 110 is formed in the base plate 11, and a light source 3 is installed in the mounting hole 110. The light guide plate 2 includes a light guide portion 21 located within a frame area A of the backlight module, and a light emitting portion 22 located within a transparent area B of the backlight module. An orthographic projection of the light guide portion 21 on the base plate 11 at least covers the mounting hole 110. The light guide portion 21 is configured to reflect light emitted by the light source 3 to the light emitting portion 22.

It will be noted that the frame area A of the backlight module refers to for example a peripheral area of the backlight module, and the transparent area B of the backlight module refers to for example a middle area of the backlight module through which the light can pass.

The light emitted by the light source 3 is incident on the light guide portion 21, and the light guide portion 21 directs the light to the light emitting portion 22, for example by adopting a reflecting manner, so as to increase the optical path of the light. However, if a portion of the light emitted by light source 3 is not incident on the light guide portion 21, but is incident on the side plate 12, the portion of the light reflected by the side plate 12 may still be isolated by the light guide portion 21, thereby preventing this portion of the light from entering into the light guide portion 21.

In the backlight module provided by the embodiments of the present disclosure, since the light source 3 is located below the light guide plate 2, the space occupied by the light source 3 along a horizontal direction in FIG. 3 is saved compared with the side-type backlight module, and thus the width of the frame area is reduced, thereby realizing the narrow bezel. In addition, since the light guide plate 2 includes the light guide portion 21 located within the frame area of the backlight module, and the light emitting portion 22 located within the transparent area of the backlight module, and the light guide portion 21 can direct the light emitted by the light source 3 to the light emitting portion 22, when the light source 3 is installed in the mounting hole 110 of the base plate 11, the light emitted by the light source 3 can be reflected to the light emitting portion 22 through the light guide portion 21, thereby increasing the optical path of the light transmitted in the frame area. Therefore, the probability of firefly phenomenon that occurs in the picture displayed by the display device is reduced. On this basis, if a portion of the light emitted by the light source 3 is incident on the side plate 12 instead of entering into the light guide portion 21, then this portion of the light reflected by the side plate 12 may be isolated by a reflection function of the light guide portion 21, so that this portion of the light reflected by the side plate 12 is prevented from entering into the light guide portion 21, thereby reducing the probability of the lamp shadow that occurs in the picture displayed by the display device.

Figure 5:
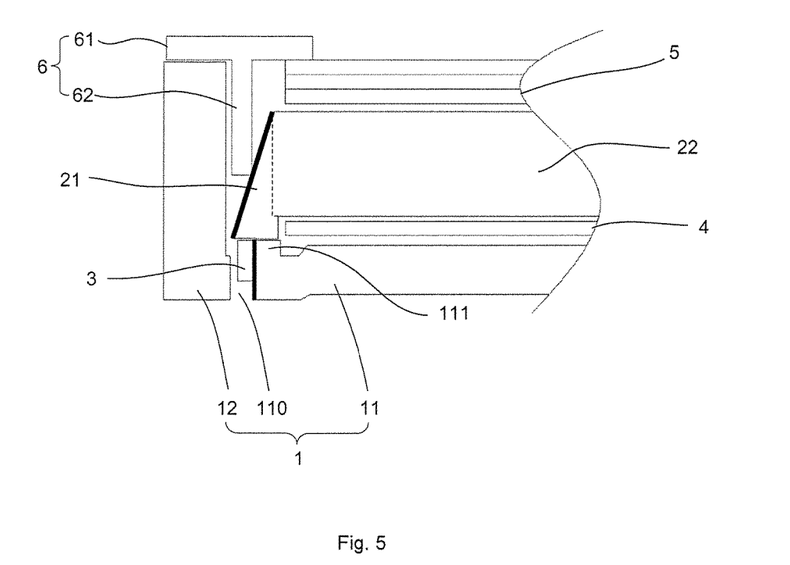
FIG. 5 is a schematic diagram of another backlight module according to some embodiments of the present disclosure.

As shown in FIGS. 3 and 5, in some embodiments of the present disclosure, the backlight module includes not only the backplane 1 and the light guide plate 2, but also a reflective film 4 located between a surface of the light emitting portion 22 close to the base plate 11 (i.e., a bottom surface of the light emitting portion) and the base plate 11, optical films 5 located at a surface of the light emitting portion 22 away from the base plate 11 (i.e., a light emitting surface of the light emitting portion), and a plastic frame 6 for securing the optical film 5 and the side plate 12.

In some embodiments of the present disclosure, as shown in FIG. 3, the light source 3 is a top view type LED light source or a beam expanding laser light source. The mounting hole 110 has a through-hole structure running through the base plate 11, and a fixed part 7 for mounting the light source 3 in the mounting hole 110 is disposed on a surface of the base plate 11 away from the light guide plate 2 (i.e., a bottom surface of the base plate).

In this case, as shown in FIG. 3, a printed circuit board or a flexible circuit board of the top view type LED light source are disposed on the bottom surface of the base plate 11.

Since the mounting hole 110 has a through-hole structure running through the base plate 11, when the backlight module is assembled, after the assembly of the structures, such as the backplane 1, the light guide plate 2, the reflective film 4, the optical films 5, the plastic frame 6, etc., is finished, the light source 3 is installed into the mounting hole 110 from the side of the base plate 11 away from the light guide plate 2 according to the different customer requirements for the light brightness and color gamut, so as to facilitate the assembly of the backlight module, thereby improving the assembly speed of the backlight module to meet the customer requirements.

In order to ensure the stability of the light source 3 in the mounting hole 110, the light source 3 is fixed in the mounting hole 110 through the fixed part 7, and the fixed part 7 may have various common fixed structures, such as a fixing tape with a heat dissipation function, etc. When the fixing tape is used as the fixed part 7, the heat emitted by the light source 3 may be dissipated by the fixing tape when the light source 3 is fixed in the mounting hole 110, so as to avoid the problem that the heat emitted by the light source 3 is difficult to be dissipated which causes the reduction of the service life of the light source 3.

In some embodiments of the present disclosure, as shown in FIG. 5, the light source 3 is a side view type LED light source. The mounting hole 110 is a through-hole structure running through the base plate 11, and the side view type LED light source is fixed on a side wall of the mounting hole 110.

In this case, as shown in FIG. 5, the printed circuit board or the flexible circuit board of the LED light source are disposed on the side wall of the mounting hole 110.

Whether the light source is the top view type LED light source or the side view type LED light source, a thickness of the frame area of the backlight module along the horizontal direction shown in FIG. 5 is influenced only by the area of the light-emitting surface of the light source 3, and the influence of the thickness of the circuit board of the light source 3 does not need to be considered. The area of the light-emitting surface of the common light source 3 is small, and thus when the backlight module with the common light source is applied to a display device, a narrow bezel may be realized.

In some embodiments, as shown in FIG. 3, the light-emitting surface of the top view type LED light source is a top surface of the light source 3, and as shown in FIG. 5, the light-emitting surface of the side view type LED light source is a top surface of the light source 3.

In some embodiments, a width of the light-emitting surface of the side view type LED light source ranges approximately from 0.6 mm to 0.8 mm. A width of the light emitting surface of the top view type LED light source ranges approximately from 1.4 mm to 2.0 mm. As shown in FIGS. 3 and 5, the width direction of the light-emitting surface of the light source is a horizontal direction.

In some embodiments, the width of the light emitting surface of the side view type LED light source ranges from 0.6 mm to 0.8 mm, such as 0.6 mm, 0.7 mm, 0.8 mm, etc. The width of the light emitting surface of the top view type LED light source ranges from 1.4 mm to 2.0 mm, such as 1.4 mm, 1.5 mm, 1.6 mm, 1.7 mm, 1.8 mm, 1.9 mm, 2.0 mm, etc.

It can be seen that, when the side view type LED light source is used as the light source 3, the frame area of the backlight module may be narrower.

For the top view type LED light source, since other driving boards are disposed on the bottom surface of the base plate 11, the printed circuit board or the flexible circuit board of the top view type LED light source may also be disposed on the surface of the base plate 11 away from the light guide plate 2, so that the space may be used more reasonably.

Similarly, for the beam expanding laser light source, since other driving boards are disposed on the surface of the base plate 11 away from the light guide plate 2, the structure used by the beam expanding laser light source may also be disposed on the surface of the base plate 11 away from the light guide plate 2, so that the space may be used more reasonably.

When the light-emitting surface of the light source 3 touches a surface of the light guide portion 21 close to the light source 3 (i.e., a bottom surface of the light guide portion), the light emitted by the light source 3 is easily incident on the side plate 12. Therefore, in order to ensure that the light emitted by the light source 3 enters into the light guide portion 21 as much as possible, as shown in FIGS. 3 and 5, in some embodiments of the present disclosure, a gap is provided between the light-emitting surface of the light source 3 and the bottom surface of the light guide portion 21. In this way, the percentage of the light emitted by the light source 3 entering into the light guide portion 21 is improved.

The ways to achieve the structure that the orthographic projection of the light guide portion 21 on the base plate 11 at least covers the mounting hole 110 will be illustrated below.

In some embodiments, as shown in FIG. 3, the orthographic projection of the light guide portion 21 on the base plate 11 covers only the mounting hole 110. That is, the orthographic projection of the light guide portion 21 on the base plate 11 coincides with the mounting hole 110, and the bottom of the light guide portion 21 close to the light source 3 is located in the mounting hole 110. A cushion 8 is disposed on the wall of the mounting hole 110. When the gap is provided between the light-emitting surface of the light source 3 and the bottom surface of the light guide portion 21, the gap is located in the mounting hole 110.

If the backlight module is shaked, the movement of the light guide portion 21 may be limited by the mounting hole 110, thereby avoiding a large shaking of the light guide 21. In this way, the possibility of the movement of the light guide plate 2 may be reduced, and the stability of the picture displayed by the display device may be improved. In addition, since the cushion 8 is disposed on the wall of the mounting hole 110, when the light guide portion 21 contacts with the wall of the mounting hole 110, the light guide portion 21 may be protected by the cushion 8, thereby preventing the light guide portion 21 from being scratched by the wall of the mounting hole 110 which may affect a light guiding function of the light guide portion 21.

In some other embodiments, as shown in FIG. 5, a supporting block 111 is disposed on a surface of the base plate 11 close to the light guide portion 21. The orthographic projection of the light guide portion 21 on the base plate 11 covers the mounting hole 110 and an orthographic projection of the supporting block 111 on the base plate 11. In other words, the orthographic projection of the supporting block 111 on the base plate 11 is located within the orthographic projection of the light guide portion 21 on the base plate 11. Since the supporting block 111 is disposed on the surface of the base plate 11 close to the light guide portion 21, the supporting block 111 may support the light guide portion 21, so as to ensure that the light guide portion 21 may be stably provided above the mounting hole 110. On this basis, by making the light-emitting surface of the light source 3 flush with the surface of the base plate 11 close to the light guide plate 2, an unnecessary light reflection is avoided as far as possible before the light is incident on the light guide portion 21.

Since the supporting block 111 is disposed on the base plate 11, the supporting block 111 can not only support the light guide portion 21, but also provide a gap (i.e. a light guide gap) between the light-emitting surface of the light source 3 and the bottom surface of the light guide portion 21, thereby improving the percentage of the light emitted by the light source 3 entering into the light guide portion 21.

In some embodiments, the supporting block 111 and the base plate 11 are molded in one body. In some other embodiments, the supporting block 111 and the base plate 11 are separate components.

Figure 4:
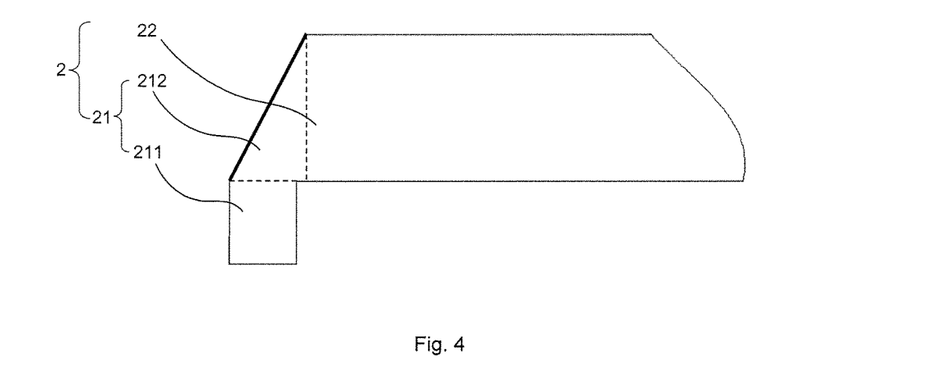
FIG. 4 is a schematic structure diagram of the light guide plate shown in FIG. 3.
Figure 6:
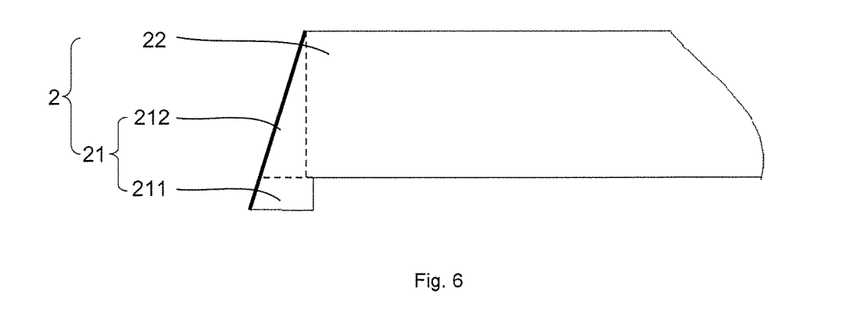
FIG. 6 is a schematic structure diagram of the light guide plate shown in FIG. 5.

In some embodiments of the present disclosure, as shown in FIGS. 4 and 6, the light guide portion 21 includes a light reflecting portion 212 and a light importing portion 211.

In some embodiments, the light reflecting portion 212 and the light emitting portion 22 are molded in one body, and the light importing portion 211 is a separate component. In some other embodiments, the light reflecting portion 212, the light emitting portion 22 and the light importing portion 211 are molded in one body. However, in order to clearly describe the structures of the light reflecting portion 212, the light emitting portion 22 and the light importing portion 211, surfaces of the light reflecting portion 212, the light emitting portion 22 and the light importing portion 211 will be introduced below, and some of the surfaces may be non-existent in the actual production, which is determined depending on the structure of the light guide plate 2.

For example, in the situation that the light reflecting portion 212 and the light emitting portion 22 are molded in one body and the light importing portion 211 is a separate component, the light incident surface of the light emitting portion 22 is non-existent and the light emitting surface of the light reflecting portion 212 is non-existent in the actual production. In other examples, in the situation that the light reflecting portion 212, the light emitting portion 22 and the light importing portion 211 are molded in one body, the light incident surfaces of the light reflecting portion 212 and the light emitting portion 22 are non-existent and the light emitting surfaces of the light importing portion 211 and the light reflecting portion 212 are non-existent in the actual production.

The term "light incident surface" in the following embodiments refers to for example a surface on which the light is incident, and the term "light emitting surface" in the following embodiments refers to for example a surface from which the light is emitted.

The light reflecting portion 212 is configured to reflect the light emitted by the light source 3 to the light emitting portion 22. The light importing portion 211 is fixed on a light incident surface of the light reflecting portion 212 through its light emitting surface. A surface of the light importing portion 211 away from the light reflecting portion 212 (i.e., a bottom surface of the light importing portion) is at least opposite to the mounting hole 110, and the light emitting surface of the light reflecting portion 212 is connected to the light emitting portion 22.

In some embodiments, the light emitting surface of the light importing portion 211 and the light incident surface of the light reflecting portion 212 are the same surface.

In some embodiments of the present disclosure, as shown in FIGS. 3 and 4, the backplane further includes a side plate 12 fixedly connected to the base plate 11. A surface of the light reflecting portion 212 close to the side plate 12 is an inclined surface with a reflective structure. In some embodiments, the reflective structure is a reflective layer formed on the inclined surface by using a coating process, or a reflective film formed on the inclined surface by using a bonding method. Therefore, when the light is incident on the side plate 12, the light reflected by the side plate 12 may be isolated by the reflective structure, thereby avoiding the appearance of the lamp shadow in the picture displayed by the display device.

In some embodiments of the present disclosure, the bottom surface of the light importing portion 211, the light emitting surface of the light importing portion 211, and the light incident surface of the light reflecting portion 212 are all parallel to the board surface of the base plate 11.

The bottom surface of the light importing portion 211 is connected to the light emitting surface of the light importing portion 211 through an outer side surface and an inner side surface of the light importing portion 211. The outer side surface is a surface of the light importing portion 211 facing the side plate 12, and the inner side surface is a surface of the light importing portion 211 facing away from the side plate 12. An angle between the bottom surface of the light importing portion 211 and the outer side surface is 90°, and an angle between the bottom surface of the light importing portion 211 and the inner side surface is 90°. On this basis, an orthographic projection of the light emitting surface of the light importing portion 211 on a plane of the bottom surface of the light importing portion 211 coincides with the bottom surface of the light importing portion 211.

In some embodiments, the inclined surface of the light reflecting portion 212 is connected to the light incident surface of the light reflecting portion 212 and the light emitting surface of the light reflecting portion 212. An angle between the light incident surface of the light reflecting portion 212 and the light emitting surface of the light reflecting portion 212 is 90°. A size of an angle between the inclined surface of the light reflecting portion 212 and the light incident surface of the light reflecting portion 212 is set according to the width of the frame area of the backlight module.

When the width of the frame area of the backlight module is narrower, the angle between the inclined surface of the light reflecting portion 212 and the light incident surface of the light reflecting portion 212 is larger. When the width of the frame area of the backlight module is wider, the angle between the inclined surface of the light reflecting portion 212 and the light incident surface of the light reflecting portion 212 is smaller. In some embodiments, the angle between the inclined surface of the light reflecting portion 212 and the light incident surface of the light reflecting portion 212 ranges from 30° to 60°. Of course, the angle is not limited to this, and can be set according to the practical requirement. For example, the angle between the inclined surface of the light reflecting portion 212 and the light incident surface of the light reflecting portion 212 is 30°, 35°, 40°, 45°, 50°, 55°, or 60°.

In some embodiments of the present disclosure, the angle between the inclined surface of the light reflecting portion 212 and the light incident surface of the light reflecting portion 212 is 45°, and then after entering into the light importing portion 211, the light emitted by the light source 3 can be incident on the inclined surface of the light reflecting portion 212 at an incident angle of 45°, thereby ensuring that the light reflected by the inclined surface of the light reflecting portion 212 may be incident on the light incident surface of the light emitting portion 22 in a direction perpendicular to the light incident surface of the light emitting portion 22.

In some embodiments of the present disclosure, as shown in FIGS. 5 and 6, surfaces of the light importing portion 211 and the light reflecting portion 212 close to the side plate 12 are inclined surfaces with a reflective structure, and the inclined surfaces of the light guide portion 211 and the light reflecting portion 212 are located in a same plane. In some embodiments, the reflective structure is a reflective layer formed on the inclined surfaces by using a coating process or is a reflective film formed on the inclined surfaces by using a bounding method. Therefore, when the light is incident on the side plate 12, the light reflected by the side plate 12 may be isolated by the reflective structure, thereby avoiding the appearance of the lamp shadow in the picture displayed by the display device.

In this structure, since the surfaces of the light reflecting portion 212 and the light importing portion 211 close to the side plate 12 are the inclined surfaces with the reflective structure, when the light emitted by the light source 3 enters into the light importing portion 211, the light which will leak from the light importing portion 211 will be reflected to the light importing portion 211 through part of the reflective structure formed on the inclined surface of the light importing portion 211. Furthermore, if the light emitted by the light source 3 does not enter into the light importing portion 211, but is incident on the side plate 12, the light is reflected to the inclined surface of the light importing portion 211 by the side plate 12, and the light reflected by the side plate 12 may be prevented from entering into the light importing portion 211 through the reflective structure formed on the inclined surface of the light importing portion 211.

In some embodiments of the present disclosure, the bottom surface of the light importing portion 211 and the light incident surface of the light reflecting portion 212 are both parallel to the board surface of the base plate 11.

The inclined surface of the light importing portion 211 is connected to the bottom surface of the light importing portion 211 and the light emitting surface of the light importing portion 211. The inclined surface of the light reflecting portion 212 is connected to the light incident surface of the light reflecting 212 and the light emitting surface of the light reflecting portion 212.

In some embodiments, the bottom surface of the light importing portion 211 is also connected to the light emitting surface of the light importing portion 211 through an inner side surface of the light importing portion 211 facing away from the side plate 12. In some embodiments, the angle between the bottom surface of the light guide portion 211 and the inner side surface is 90°. The size of the angle between the inclined surface of the light importing portion 211 and the bottom surface of the light importing portion 211, and the size of the angle between the inclined surface of the light reflecting portion 212 and the light incident surface of the light reflecting portion 212 may refer to the aforementioned corresponding description.

When the width of the frame area of the backlight module is narrower, the angle between the inclined surface of the light importing portion 211 and the bottom surface of the light importing portion 211, and the angle between the inclined surface of the light reflecting portion 212 and the light incident surface of the light reflecting portion 212 are larger. When the width of the frame area of the backlight module is wider, the angle between the inclined surface of the light importing portion 211 and the bottom surface of the light importing portion 211, and the angle between the inclined surface of the light reflecting portion 212 and the light incident surface of the light reflecting portion 212 are smaller.

The angle between the inclined surface of the light reflecting portion 212 and the light incident surface of the light reflecting portion 212 ranges from 30° to 60°, such as 30°, 35°, 40°, 45°, 50°, 55°, or 60°.

Since the inclined surfaces of the light guide portion 211 and the light reflecting portion 212 are located in a same plane, the angle between the inclined surface of the light importing portion 211 and the bottom surface of the light importing portion 211 will not be repeated.

In some embodiments of the present disclosure, the angle between the inclined surface of the light importing portion 211 and the bottom surface of the light importing portion 211 is 45°, the angle between the light incident surface of the light reflecting portion 212 and the light emitting surface of the light reflecting portion 212 is 90°, and the angle between the inclined surface of the light reflecting portion 212 and the light incident surface of the light reflecting portion 212 is 45°. In this case, after the light enters into the light importing portion 211, it can pass through the light importing portion 211 and the light reflecting portion 212 and then enters into the light emitting portion 22 in an optimum direction, thereby improving the light emitting brightness.

As the light importing portion 211 has the inclined surface, after the light emitted by the light source 3 enters into the light importing portion 211, it can be easily reflected by part of the reflective structure formed on the inclined surface of the light importing portion 211 to cause a light leakage. Regarding to this, a distance from the bottom surface of the light importing portion 211 to the light emitting surface of the light importing portion 211 is as small as possible, so that the light may enter into the light reflecting portion as much as possible after being reflected by the part of reflective structure formed on the inclined surface of the light importing portion 211, thereby reducing the light loss.

In some embodiments, when the light guide plate 2 is prepared, the light importing portion 211, the light reflecting portion 212 and the light emitting portion 22 are prepared by adopting a one-off process. In some other embodiments, the side surface of the conventional light guide plate 2 is made into an inclined surface, so that the conventional light guide plate 2 is formed into an one-piece structure including the light reflecting portion 212 and the light emitting portion 22, and then the light importing portion 211 is formed on or connected to the light incident surface of the light reflecting portion 212. The material of the light importing portion 211 is for example an UV-curable resin or the material of the light guide plate 2.

In some embodiments of the present disclosure, the backlight module further includes a plastic frame 6. As shown in FIGS. 3 and 5, the plastic frame 6 includes a connecting portion 61 and a clamping portion 62 disposed on the connecting portion 61, and the connecting portion 61 is connected to the side plate 12 and the optical films 5. In the related art, the clamping portion 62 is generally disposed between the side plate 12 and the light guide plate 2, and a part of space of the frame of the backlight module is occupied by the clamping portion 62. However, in the embodiments of the present disclosure, since the light guide portion 21 includes the light reflecting portion 212, and the inclined surface of the light reflecting portion 212 is close to the side plate 12, an end of the clamping portion 62 is limited to touch the inclined surface of the light reflecting portion 212, so that the clamping portion 62 is received in the space above the light reflecting portion 212, thereby further reducing the width of the frame area.

Figure 7:
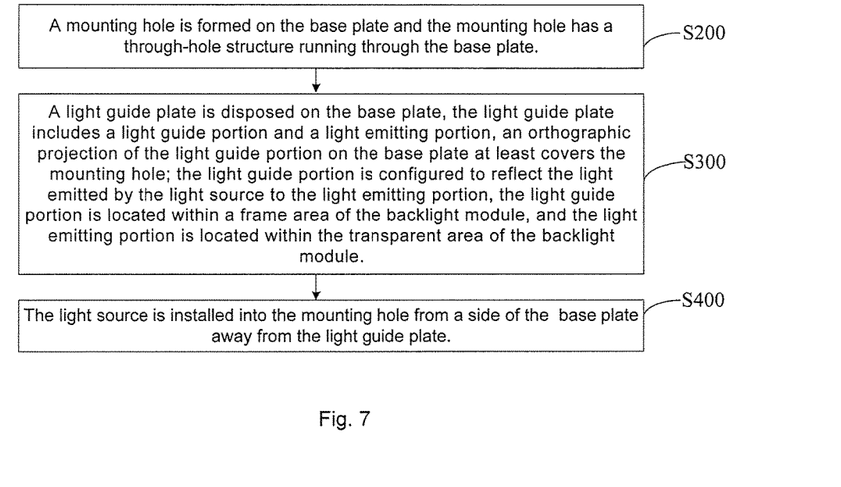
FIG. 7 is a flowchart of a method for preparing a backlight module according to some embodiments of the present disclosure.

Some embodiments of the present disclosure provide a method for preparing a backlight module, such as the aforementioned backlight module, and the method includes steps 200-400 (S200-S400).

In S200, a mounting hole 110 is formed in a base plate 11. The mounting hole 110 has a through-hole structure running through the base plate 11.

In S300, a light guide plate 2 is placed above the base plate 11. The light guide plate 2 includes a light guide portion 21 and a light emitting portion 22, and an orthographic projection of the light guide portion 21 on the base plate 11 at least covers the mounting hole 110. The light guide portion 21 is configured to reflect the light emitted by the light source 3 to the light emitting portion 22. The light guide portion 21 is located within a frame area of the backlight module, and the light emitting portion 22 is located within a transparent area of the backlight module.

In S400, the light source 3 is installed into the mounting hole 110 from a side of the base plate 11 away from the light guide plate 2.

The beneficial effects of the method for preparing the backlight module provided by the embodiments of the present disclosure are the same as that of the backlight module described above, which will not be repeated.

In addition, since the mounting hole 110 has a through-hole structure running through the base plate 11, after the preparation of other structures of the backlight module is finished, according to different customer requirements for the light brightness and color gamut, the light source 3 is installed into the mounting hole 110 from the side of the base plate 11 away from the light guide plate 2, thereby improving the assembly speed of the backlight module to meet the customer requirements.

Some embodiments of the present disclosure provide a display device, and the display device includes the aforementioned backlight module.

The beneficial effects of the display device provided by the embodiments of the present disclosure are the same as that of the aforementioned backlight module, which will not be repeated.

In the description of the above embodiments, features, structures, materials or characteristics may be combined in one or more embodiments or examples in any suitable manner.

The above descriptions are merely some embodiments of the present disclosure, but the protection scope of the disclosure is not limited thereto. In the technical scope disclosed by the disclosure, changes or substitutions, which can be easily thought by those skilled in the art, should be within the protection scope disclosed by the present disclosure. Therefore, the protection scope of the present disclosure should be subject to the protection scope of the claims.

What is claimed is:

1. A backlight module, comprising:
    a backplane comprising a base plate, wherein a mounting hole is formed in the base plate, and a light source is installed in the mounting hole; and
    a light guide plate disposed at a side of the base plate, wherein the light guide plate comprises:
        a light guide portion located within a frame area of the backlight module, wherein an orthographic projection of the light guide portion on the base plate at least covers the mounting hole; and
        a light emitting portion located within a transparent area of the backlight module, wherein the light guide portion is configured to reflect light emitted by the light source to the light emitting portion.

2. The backlight module according to claim 1, wherein, there is a gap between a light-emitting surface of the light source close to the light guide portion and a bottom surface of the light guide portion close to the light source.

3. The backlight module according to claim 1, wherein, the light guide portion comprises:
    a light reflecting portion configured to reflect the light emitted by the light source to the light emitting portion; and
    a light importing portion, via its light emitting surface, fixed to a light incident surface of the light reflecting portion, a bottom surface of the light importing portion away from the light reflecting portion is at least opposite to the mounting hole, and a light emitting surface of the light reflecting portion is connected to the light emitting portion.

4. The backlight module according to claim 3, wherein, the backplane further comprises a side plate fixedly connected to the base plate;
    a surface of the light reflecting portion close to the side plate is an inclined surface with a reflection structure; or,
    surfaces of the light importing portion and the light reflecting portion close to the side plate are inclined surfaces with a reflection structure, and the inclined surfaces of the light importing portion and the light reflecting portion are located in a same plane.

5. The backlight module according to claim 4, wherein, the surface of the light reflecting portion close to the side plate is an inclined surface with a reflection structure, the bottom surface of the light importing portion and a light incident surface of the light reflecting portion are both parallel to a board surface of the base plate;
    the inclined surface of the light reflecting portion is connected to the light incident surface of the light reflecting portion and the light emitting surface of the light reflecting portion, and an angle between the inclined surface of the light reflecting portion and the light incident surface of the light reflecting portion ranges from 30° to 60°.

6. The backlight module according to claim 4, wherein, the surfaces of the light importing portion and the light reflecting portion close to the side plate are inclined surfaces with a reflection structure, the inclined surfaces of the light importing portion and the light reflecting portion are located in a same plane, and the bottom surface of the light importing portion and the light incident surface of the light reflecting portion are both parallel to the board surface of the base plate;

the inclined surface of the light importing portion is connected to the bottom surface of the light importing portion and the light emitting surface of the light importing portion, the inclined surface of the light reflecting portion is connected to the light incident surface of the light reflecting portion and the light emitting portion of the light reflecting portion, an angle between the inclined surface of the light importing portion and the bottom surface of the light importing portion ranges from 30° to 60°, and an angle between the inclined surface of the light reflecting portion and the light incident surface of the light reflecting portion ranges from 30° to 60°.

7. The backlight module according to claim 4, wherein, optical films are disposed on a light emitting surface of the light emitting portion, and the optical films are connected to the side plate through a plastic frame;

the plastic frame comprises a connecting portion and a clamping portion disposed on the connecting portion, the connecting portion is connected to the side plate and the optical films, an end of the clamping portion touches the inclined surface of the light reflecting portion.

8. The backlight module according to claim 1, wherein, the orthographic projection of the light guide portion on the base plate coincides with the mounting hole, the bottom surface of the light guide portion is located in the mounting hole, and a cushion is disposed on a wall of the mounting hole.

9. The backlight module according to claim 1, wherein, a supporting block is disposed on a surface of the base plate close to the light guide portion;

the orthographic projection of the light guide portion on the base plate covers the mounting hole, an orthographic projection of the supporting block on the base plate is located within the orthographic projection of the light guide portion on the base plate, and a light-emitting surface of the light source close to the light guide plate is flush with a surface of the base plate close to the light guide plate.

10. The backlight module according to claim 1, wherein,
the light source is a top view type LED light source or a beam expanding laser light source, the mounting hole has a through-hole structure running through the base plate, and a fixed part configured to fix the light source in the mounting hole is disposed on a surface of the base plate away from the light guide plate; or the light source is a side view type LED light source, the mounting hole has a through-hole structure running through the base plate, and the side view type LED light source is fixed on a wall of the mounting hole.

11. A method for preparing the backlight module according to claim 1, and the method comprising:

forming a mounting hole in the base plate, the mounting hole having a through-hole structure running through the base plate;

disposing the light guide plate above the base plate, wherein the light guide plate comprises a light guide portion and a light emitting portion, an orthographic projection of the light guide portion on the base plate at least covers the mounting hole, the light guide portion is configured to reflect light emitted by the light source to the light emitting portion, the light guide portion is located within a frame area of the backlight module, and the light emitting portion is located within a transparent area of the backlight module; and installing the light source into the mounting hole from a side of the base plate away from the light guide plate.

12. A display device comprising the backlight module according to claim 1.

* * * * *